United States Patent [19]

Ward

[11] 3,927,131
[45] Dec. 16, 1975

[54] DEHYDROHALOGENATION OF HALOGENATED HYDROCARBONS

[75] Inventor: Joe Arthur Ward, Lake Jackson, Tex.

[73] Assignee: The Dow Chemical Company, Midland, Mich.

[22] Filed: June 10, 1974

[21] Appl. No.: 477,577

[52] U.S. Cl............ 260/654 D; 260/655; 260/656 R
[51] Int. Cl.²................................................. C07C 21/00
[58] Field of Search.. 260/654 D, 655, 656, 677 XA

[56] References Cited
UNITED STATES PATENTS

| | | | |
|---|---|---|---|
| 2,765,350 | 10/1956 | Conrad | 260/654 D |
| 3,312,747 | 4/1967 | Bissot et al. | 260/654 D |
| 3,522,325 | 7/1970 | Aristoff et al. | 260/654 D |

Primary Examiner—Delbert E. Gantz
Assistant Examiner—Joseph A. Boska
Attorney, Agent, or Firm—A. Cooper Ancona

[57] ABSTRACT

An improved method of dehydrohalogenating halogenated aliphatic hydrocarbons by employing a catalyst which comprises a rare earth oxide, e.g. lanthanium oxide, or the rare earth oxide together with a platinum group metal, e.g. platinum, on a suitable support. The dehydrochlorination of 1,2,3-trichloropropane to 1,3-dichloropropenes has been accomplished with increased selectivity and less undesirable carbon formation.

9 Claims, No Drawings

DEHYDROHALOGENATION OF HALOGENATED HYDROCARBONS

BACKGROUND OF THE INVENTION

Various saturated halogenated compounds containing two to four carbon atoms and containing two to four or more halogen atoms have been dehydrohalogenated by various means to produce the corresponding unsaturated halogenated compounds having the same number of carbon atoms.

Vinyl chloride is commonly prepared by dehydrochlorinating 1,2-dichloroethane. This has been done thermally without catalysts, but numerous catalysts have also been employed. Among these catalysts are zinc chloride employed together with halides of Mg, Ca, Sr or Ba (Japanese Pat. No. 73/10131); and alumina together with platinum and phosphorous (U.S.S.R. Pat. No. 367,882). The presence of small amounts of chlorine also promotes the dehydrohalogenation of halogenated hydrocarbons to produce vinyl chloride, dichloroethylenes, trichloroethylenes and the like. Likewise, other halogens and halogen-yielding compounds promote these dehydrohalogenations (U.S. Pat. No. 2,378,859).

Vinylidene chloride (1,1-dichloroethylene) has been made by passing vapors of 1,1,2-trichloroethane at 300°–500°C over NaCl crystals (U.S. Pat. No. 3,760,015). Another process employs temperatures of 100°–300°C over a metal halide of K, Cs or Rb (Netherlands Pat. No. 72/16235).

Other dehydrohalogenation processes employ catalysts of alumina, platinum and fluorine (U.S.S.R. Pat. No. 355,138); ferric chloride (U.S. Pat. No. 3,732,322); alumina and a $C_1$-$C_4$ alcohol (Japanese patent 73/10130); copper oxide and/or copper chloride with KCl or $MgCl_2$ as a co-catalyst (Japanese Pat. No. 73/28409). Most of the processes employ temperatures in the range of 300°–450°C, although a few employ lower temperatures around 200°C. All of the foregoing processes are conducted in the vapor phase.

Certain divalent cation-exchanged sodium zeolites have been employed to dehydrochlorinate tertiary butyl chloride at 100° to 150°C to form isobutene. This process is described in U.S. Pat. No. 2,920,122.

It has now been found that increased selectivity and less carbon losses are achieved in dehydrohalogenation reactions by employing a supported catalyst of a rare earth oxide or a mixture of a rare earth oxide in combination with a metal from the platinum group in a vapor phase dehydrohalogenation process.

SUMMARY OF THE INVENTION

The present invention is a process for dehydrohalogenating halogenated hydrocarbons to obtain unsaturated hydrocarbon compounds containing the same number of carbon atoms. The use of a catalyst of a rare earth metal oxide alone or together with a metal from the platinum group as a promoter permits good conversion and selectivity with less than 10% loss to carbon formation.

DETAILED DESCRIPTION OF THE INVENTION

The present process is conducted in the vapor phase at temperatures of from about 400°–600°C, preferably 550°–590°, and at pressures of from about atmospheric to 100 psig, although 5–10 psig is preferred. Contact time will depend largely upon the temperature and the particular halogenated hydrocarbon employed as the feed material as well as the product desired. Generally, contact times in the range of from about 0.4 to about 4 seconds are sufficient, while those in the range of from 1.0 to 3.0 seconds are preferred.

Those compounds having three or more carbon atoms and two or more halogen atoms can be dehydrohalogenated completely to form unsaturated polyolefinic hydrocarbons with longer contact times. Diolefinic halogenated compounds may also be obtained by using unsaturated chlorinated compounds containing more than one halogen atom, e.g. dichloropropenes, trichlorobutanes and the like.

The products with which the present process is more particularly concerned are the useful monounsaturated halogenated products, e.g. vinyl chloride, allyl chloride, the dichloropropenes and other compounds containing a single olefinic bond and one or more halogen atoms, such as the halogenated butenes, pentenes, hexenes and the like.

Suitable feed materials for the process are halogenated hydrocarbons having from two to about 12 carbon atoms and containing from two to six or more halogen atoms. Generally, since it is desired to obtain unsaturated halogenated products, the preferred feed materials are the saturated halogenated hydrocarbons containing more than one halogen atom.

Thus, saturated halogenated compounds such as 1,1- and 1,2-dichloroethane 1,2- and 1,3-dichloropropane, 1,2,3-trichloropropane, 1,2-dichlorobutane, dichloro- and trichloropentanes, hexanes, octanes, decanes and the like; brominated and other halogenated compounds, analogous to the foregoing chlorinated compounds, are also useful in the dehydrohalogenation process of the present invention.

Useful compounds produced from the above feed materials are vinyl chloride, 1,2- and 1,3-dichloropropenes, allyl chloride, 2-chloropropene, dichlorobutenes, monochlorobutenes; mono-, di-, and trichloropentenes, the analogous chloro-hexenes and the like.

The catalysts of this invention are made by known methods of coating supports e.g. by soaking in solutions of rare earth salts and/or together with platinum group metal salts. The supports are dried and subsequently calcined so that rare earth and platinum group metal oxides are formed on the support, any platinum group metal oxide formed thereby is subsequently reduced to form the pure metal, usually by employing hydrogen as the reducing agent. The rare earth oxides, being difficult to reduce, at least at the temperatures (500°–600°C) employed for the calcining of the catalyst, remain as the oxides; while the platinum group metal salts are easily reduced at those temperatures to the pure metals in the presence of hydrogen or other reducing gas.

The materials useful as catalysts in the present invention are the rare earth oxides of the lanthanide series, e.g. the oxides of lanthanum, cerium, neodymium, gadolinium, and ytterbium; and the metals of the platinum group, e.g. platinum, palladium, rhodium, ruthenium, osmium and iridium. These may be placed on the support, e.g. alumina particles, by soaking the support in an aqueous solution of their salts e.g. chlorides, nitrates, acetates, sulfates and the like, which are soluble in water or acidic aqueous solutions. The rare earth and platinum group metal salts are subsequently oxidized and any platinum group metal oxide formed thereby is reduced to the pure metal.

Alternatively, the rare earth oxide or the rare earth oxde together with the platinum group metal may be incorporated into the structure of a zeolite during the preparation of synthetic zeolites, e.g. SK-120, a synthetic zeolite manufactured by Linde Division of Union Carbide Corporation, which contains rare earth oxides and palladium.

The catalyst compositions containing the rare earth oxides or the rare earth oxides in combination with a platinum group metal are employed on a support such as alumina or silica, or combinations thereof. Other materials ordinarily employed as catalyst supports are suitable providing they withstand the temperatures employed in the process, retain the catalytic materials and do not deleteriously affect the results of the process.

The rare earth oxides are employed on the support at a concentration within the range of from about one to about ten percent, while the platinum group metal, when present, is employed in an amount of from about 0.1 to about two percent. The optimum amounts in each case depends upon the reactants employed, the product desired and the temperature of reaction.

The present invention thus resides in an improved vapor phase process for the thermal dehydrohalogenation of aliphatic halogenated hydrocarbons which comprises employing a catalytic material which can be either a rare earth oxide or a platinum group metal in combination therewith.

PREPARATION OF THE CATALYST

Example 1

An alumina in the form of one-eighth inch pellets was placed in a pan containing a sufficient volume of a solution of lanthanum chloride and palladium chloride to just fill the void volume of the catalyst support employed. The wetted catalyst support was then dried in an oven at 200°C for a period of about four hours. Finally, it was calcined in an air stream at 500°C for a period of eight hours. After placing the catalyst in the reactor it was activated by reducing the palladium metal content to the pure metal in a stream of hydrogen (2.4 l./hr.) for about seven hours at 580°C. This catalyst contained 10% $La_2O_3$ and 1.0% Pd.

Catalysts employing other rare earth oxides and other platinum group metals were prepared in a similar fashion. The concentration of the salt solutions were adjusted so that the proper proportions of metal salts were deposited on the support to provide the desired weight per cent of catalytic oxide and metal in the finished catalyst.

UTILIZATION OF CATALYST

Example 2

The reactor employed was an Inconel* pipe about 22.9 cm. in length and having a diameter of about 1.57 cm. and contained about 40 ml. (bulk volume) of catalyst. The catalyst bed was heated externally by resistance heating and a preheater was used just ahead of the reactor to vaporize and heat the reactants to about 200°C. A brine condenser was employed to cool and condense the product gases at the exit end of the reactor. Analysis of product gases was made by vapor phase chromatography using ethylene dichloride (1,2-dichloroethane) as the internal standard in a 1200 Varian instrument. The reactant chlorinated hydrocarbon employed, contact times, catalyst employed, % conversion, % selectivity and % carbon loss are all given in the following tables. All of the runs in Tables I were conducted at a temperature of 590°C under a pressure of 5 psig.

*Trademark of the International Nickel Co. for an alloy of approximately 78% nickel, 15% chromium and 6% iron.

TABLE I

| Example | Run* No. | Feed | Catalyst | Contact Time (Sec.) | Percent Conversion | Percent** Selectivity | Percent Carbon Loss |
|---|---|---|---|---|---|---|---|
| 1. | Y | TCP* | $Al_2O_3$+1% $La_2O_3$ | 1.5 | 45.5 | 65.7 | 6.0 |
|  | D | " | $Al_2O_3$+5% $La_2O_3$ | 1.5 | 45.4 | 59.8 | 8.7 |
|  | R | " | $Al_2O_3$+10% $La_2O_3$ | 1.5 | 35.2 | 63.4 | 8.3 |
|  | L | " | $Al_2O_3$+10% $CeO_2$ | 1.25 | 43.7 | 65.7 | 6.0 |
| 2. | M | " | $Al_2O_3$+10% $La_2O_3$+0.25% Pd | 1.25 | 34.8 | 62.4 | 6.7 |
|  | N | " | $Al_2O_3$+10% $La_2O_3$+0.5% Pd | 1.25 | 37.0 | 66.6 | 7.0 |
|  | P | " | $Al_2O_3$+10% $La_2O_3$+0.75% Pd | 1.25 | 36.5 | 72.0 | 1.5 |
|  | F | " | $Al_2O_3$+10% $La_2O_3$+1.0% Pd | 1.25 | 37.1 | 80.9 | 1.2 |
|  | Q | " | $Al_2O_3$+10% $La_2O_3$+1.25% Pd | 1.25 | 33.0 | 72.3 | 2.3 |
|  | S | " | $Al_2O_3$+10% $La_2O_3$+1.5% Pd | 1.25 | 38.0 | 54.0 | 7.4 |
|  | T | " | $Al_2O_3$+10% $La_2O_3$+2.0% Pd | 1.25 | 37.5 | 60.6 | 6.0 |
| 3. | H | " | $Al_2O_3$+10% $La_2O_3$+0.1% Pt | 1.25 | 37.8 | 86.4 | <1 |
|  | U | " | $Al_2O_3$+10% $La_2O_3$+0.75% Pt | 1.25 | 35.0 | 71.7 | <1 |
|  | J | " | $Al_2O_3$+10% $La_2O_3$+1.0% Pt | 1.25 | 38.0 | 86.5 | <1 |
|  | V | " | $Al_2O_3$+10% $La_2O_3$+1.5% Pt | 1.25 | 37.0 | 66.3 | 3 |
| 4. | A | " | SK-120*** | 2.5 | 53.8 | 78.9 | 3.6 |
|  | F | " | SK-120*** | 1.5 | 40.2 | 81.3 | 2.3 |
|  | C | " | SK-120*** | 1.0 | 33 | 73.9 | 7.0 |

*TCP is 1,2,3-trichloropropane
**The selectivity is the percent of converted material which made useful products, i.e. chlorinated unsaturated compounds; unsaturated hydrocarbons, e.g. ethylene or propylene, are not included.
***SK-120 is a synthetic zeolite which contains 10% rare earth oxides (not specified) and 0.5% Pd. This material is commercially available from Linde Div. of Union Carbide Corporation.

Example 5 a. Using the same catalyst (SK-120) employed in Example 4 A, C and F, above, propylene dichloride (1,2-dichloropropane) was fed over it at a contact time of 1.0 sec., a pressure of 5 psig and a temperature of 550°C. The conversion was 37% with a selectivity of about 100%. The carbon loss was less than 1%.

b. Another run over this same catalyst (SK-120) was made at a lower temperature of 450°C and a contact time of 1.5 seconds at the same pressure. A much lower conversion of 14.9% was obtained, but the selectivity was 60% and the carbon loss again only 1%, or less.

Example 6

In order to show the unexpected results of employing the catalyst of the present invention as a dehydrohalogenation catalyst the same TCP feed used above was passed over the alumina support alone in one run and over alumina burdened with 2% by weight platinum in another. The apparatus described in Example 2 was employed.

Alumina alone at a contact time of 1.0 second, .5 psig and 590°C resulted in a 56.5% conversion, a 43.6% selectivity and a carbon loss of 25.6%. The alumina plus platinum under the same process conditions gave 43.5% conversion, 48.5% selectivity and a carbon loss of 16.8%.

I claim:

1. In the method for thermally dehydrochlorinating a chlorinated aliphatic hydrocarbon containing from two to about 12 carbon atoms and from two to six chlorine atoms by contacting the chlorinated aliphatic hydrocarbon in the vapor phase with a catalyst at an elevated temperature to produce an unsaturated chlorinated hydrocarbon containing the same number of carbon atoms as said reactant chlorinated hydrocarbon, the improvement which comprises employing as the catalyst a material consisting essentially of a rare earth oxide in combination with a platinum group metal on a support.

2. The method of claim 1 wherein the catalyst is incorporated into a synthetic zeolite.

3. The method of claim 1 wherein the chlorinated aliphatic hydrocarbon is 1,2,3-trichloropropane.

4. The method of claim 1 wherein the chlorinated aliphatic hydrocarbon is 1,2-dichloropropane.

5. The method of claim 2 wherein the rare earth oxide is lanthanum oxide.

6. The method of claim 2 wherein the rare earth oxide is cerium oxide.

7. The method of claim 2 wherein the platinum group metal is palladium.

8. The method of claim 2 wherein the platinum group metal is platinum.

9. The method of claim 3 in which the platinum group metal is palladium.

* * * * *